April 25, 1933. P. A. STEPHENSON 1,905,522
MOTION PICTURE CAMERA CONTROL
Filed Dec. 16, 1929　　2 Sheets-Sheet 1

Inventor
Paul A. Stephenson.
By
Attorneys

April 25, 1933.  P. A. STEPHENSON  1,905,522
MOTION PICTURE CAMERA CONTROL
Filed Dec. 16, 1929   2 Sheets-Sheet 2
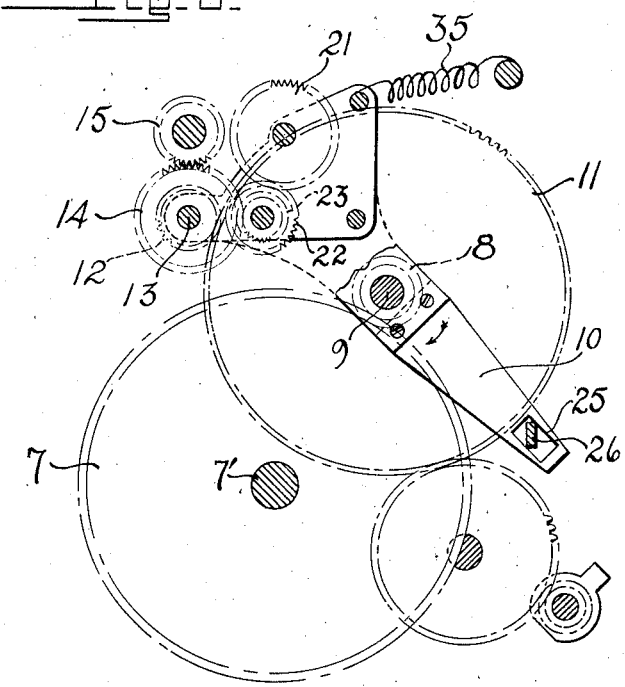
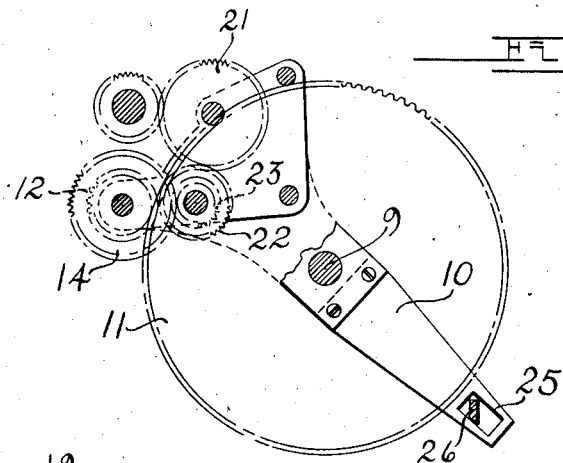
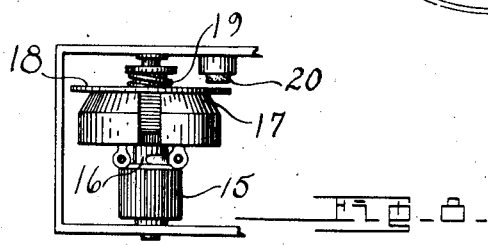
Inventor
Paul A. Stephenson.
By
Attorneys Patented Apr. 25, 1933

1,905,522

UNITED STATES PATENT OFFICE

PAUL A. STEPHENSON, OF NEWTON, MASSACHUSETTS, ASSIGNOR TO EASTMAN KODAK COMPANY, OF ROCHESTER, NEW YORK, A CORPORATION OF NEW YORK

MOTION PICTURE CAMERA CONTROL

Application filed December 16, 1929. Serial No. 414,303.

This invention relates to photography and particularly for a control for a motor operated motion picture camera. One object of my invention is to provide a controlling device for the motor which will allow the ratio of the driving gears to be altered only when the motor is standing still. Another object of my invention is to provide a controlling mechanism through which the motor speed will remain constant throughout its operation and by which the ratio of the driving gears may be altered during moments of rest of the motor. Another object of my invention is to provide a controlling mechanism which will tend to hold the parts in position for a normal speed of operation but which can be moved from this position so that the motor may turn at other than normal speeds. Still another object of my invention is to provide a release for the motor and a speed changing device under the control of the motor release and other objects will appear from the following specification, the novel features being particularly pointed out in the claims at the end thereof.

Coming now to the drawings wherein like reference characters denote like parts throughout:

Fig. 6 is a schematic showing and elevation showing a part of a gear shift mechanism with the parts in one position;

Fig. 7 is a view similar to Fig. 6 but with the parts in another position; and

Fig. 8 is a fragmentary detail showing the speed governor.

This invention is for an improvement over the motor operated motion picture camera shown in my Patent No. 1,809,256 of June 9, 1931, resulting from a copending patent application, Serial No. 331,111, filed January 8, 1929 and reference may be had to this application for details of the film drive pulldown mechanism, wind-up mechanism and other camera parts not fully described in the present application.

Figure 1:
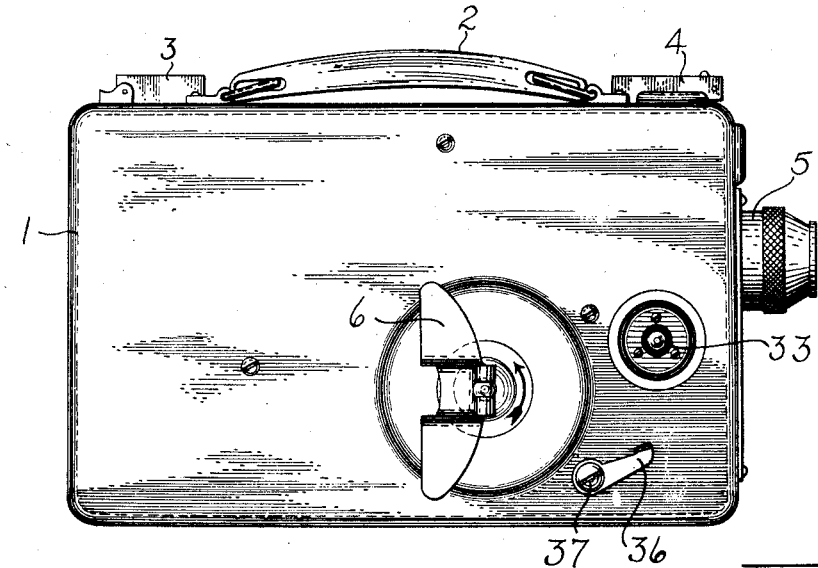
Fig. 1 is a side elevation of a motion picture camera construction in accordance with and embodying a preferred form of my invention.
Figure 2:
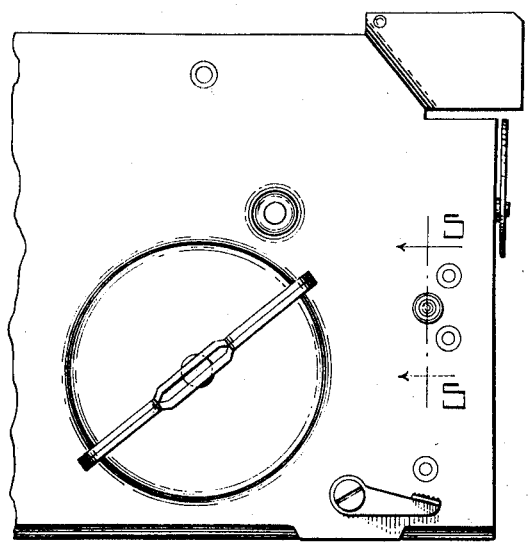
Fig. 2 is a fragmentary side elevation of a portion of the motor operating mechanism removed from the camera case.

Referring to Fig. 1 a preferred embodiment of my invention comprises a camera 1 having the usual handle 2 and finder members 3 and 4. An objective 5 may be mounted on the front of the camera and a power operated spring inside of the camera body may be tensioned by the winding 6.

The above described mechanism may be of any well known type in which camera film is moved intermittently past a gate by means of a power spring.

For certain motion picture work it is desirable to have a mechanism through which different speeds may be obtained for various purposes and to accomplish this result the mechanism which will be herein fully described may be used.

It is desirable to have a motion picture camera for amateurs which will normally operate at a known speed for giving the desired speed of movement for the majority of pictures. It is sometimes useful to use a higher or lower speed and with the mechanism which will now be described I have provided a control which permits the speed of the camera to be changed from the normal for a single burst of pictures, the mechanism being arranged so that the speed will return to normal automatically after each burst of pictures. I also have provided a mechanism which is "fool proof" to the extent that an operator cannot alter the speed of the mechanism while it is in operation. This is a useful feature because ordinarily when the camera speed is changed the diaphragm opening of the objective should be altered to compensate for the difference in exposure. The present speed change is accomplished by a gear shift arrangement which is best shown in Figs. 6 and 7. Referring to Fig. 6 the motor member (not shown) drives a gear 7 which turns about a shaft 7', shaft 7' being the shaft which may be put under tension by turning the winding key 6. Power is transmitted from gear 7 to pinion 8, the shaft 9 of which forms a pivot about which a yoke 10 may turn.

Shaft 9 is also affixed to a gear 11 which drives various parts of the camera mechanism as shown in my copending application above referred to. In addition gear 11 drives a pinion 12 carried on a shaft 13 supported by yoke 10.

Shaft 13 may drive a gear 14, and this gear, by moving the yoke 10, may be swung to and from an operative position in mesh with gear 15. As best shown in Fig. 8, gear 15 is supported by shaft 16 on which a speed governor 17 is mounted. A flange 18 of the governor is adapted to move against the pressure of spring 19 in contact with the friction pad 20 to control the speed of the machine.

A second gear 21 is adapted to mesh with gear 15 when the yoke 10 is swung from the position shown in Fig. 6 to the position shown in Fig. 7. Power is derived by gear 21 through gears 22 and 23, the latter gear meshing with gear 14 which derives its power through gear 12 from gear 11. Thus with the mechanism shown in Figs. 6 and 7 two different speeds may be obtained by turning the yoke 10 upon its pivotal point on shaft 9.

In order to move the yoke 10 the following mechanism is provided. This yoke is provided with a slotted end 25 which is engaged by one end 26 of a bell crank lever 27 pivoted at 28 to a camera wall 29 and having the other end 30 formed over at 31 to cooperate with a latching bar 32. This construction is best shown in Figs. 3 to 5 inclusive.

A push button 33 is arranged on the side wall of the camera and passes through this wall, being pivoted at 34 to an arm of the bell crank lever. As indicated in Fig. 6 there is a spring 35 which normally turns the yoke 10 in the direction shown by the arrow in which the normal speed of the camera may be obtained by the meshing of gears 14 and 15.

Figure 5:
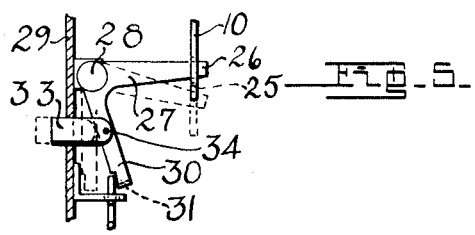
Fig. 5 is a fragmentary detailed section of 5—5 of Fig. 2.

This spring normally thrusts outwardly upon the push button 33 and in Fig. 5 the position shown in full lines indicates that the abnormal speed of the camera is in use, that is, gears 15 and 21 are in mesh.

Figure 3:
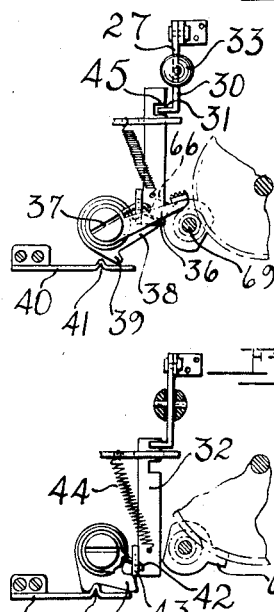
Fig. 3 is a fragmentary detail showing the relation of the shutter release and the speed changing device when the parts are in one position.
Figure 4:
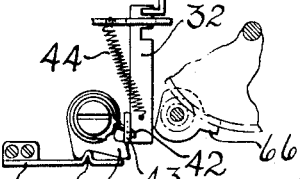
Fig. 4 is a view similar to Fig. 3 but with the parts in a different position.

The latch bar 32 shown in Figs. 3 and 4 performs a double function. The shutter release 36 is affixed to a shaft 37 carrying a plate 38 on which there is a projection 39 which forms, with spring 40, a snap latch as it is adapted to engage one side or the other side of a protuberance 41 on spring 40 thus holding the release in a set position.

Shaft 37 also carries a projection 42 which engages an aperture in the turned up flange 43 of the latching bar 32 so that each time the release 36 is moved the latch bar will be moved. A spring 44 tends to hold the latching bar and release 36 in a raised position indicated in Fig. 3.

In the present embodiment, the raised position of lever 36 may be considered an inoperative position since in this position the motor does not turn the camera mechanism, by moving release 36 from the position shown in Fig. 3 to that shown in Fig. 4 an operative position is reached in which the motor, if properly tensioned, will turn.

It should be noted from Fig. 3 that the turned over flange 31 on the end 30 of the bell crank lever 27 as above described, may be actuated by the push button 33 to move into a notch 45 in the latching bar. In other words, with the parts positioned as in Fig. 3 the push button 33 may be freely moved as the lug 31 passes through slot 45. However, just as soon as lever 36 is moved the slot 45 will pass out of the path of lug 31 so that this lug can no longer move and pressure on the push button 33 will not affect the position of the gear shift mechanism.

If the push button 33 has been moved to the position shown in Fig. 5 and the release 36 is then depressed the camera will operate at abnormal speed and will continue to do so until release 36 is moved upwardly again into a position in which the spring 35 may through its associated parts move the lug 31 through the slot 45.

On the other hand if the push button 33 is not depressed but is in the position shown in broken lines in Fig. 5 and the release 36 is depressed the camera will operate at normal speed and pressure upon the push button 33 will not alter the gear shift mechanism since the lug 31 cannot pass through slot 45 in the latch bar 32.

This latch bar, therefore, serves the double purpose of preventing a gear shift mechanism from being moved while the camera is operating and of restoring the gear shift mechanism to its normal speed when a burst of pictures is completed. It should be noted that in starting the camera for an abnormal speed the push button 33 is depressed and held only until the release 36 is depressed at which time notch 45 will have been moved from the path of lug 31 so that the push button 33 will be retained in a depressed position until the release lever 36 is raised.

From Figs. 3 and 4 it will be noted that plate 38 forms a stop for the motor mechanism by coming within the path of the lug 66 which may be revolved by shaft 69 as the camera is operated. When, however, plate 38 is moved to the position shown in Fig. 4, the lug 66 may turn freely. For further details of the camera film moving mechanism reference may be had to my copending patent application.

Having thus described my invention, what I claim as new and desire to secure by Letters Patent is:

1. In a multi-speed motion picture camera, the combination with a motor, of a release therefor movable to an operative position in which the motor may run and to an inoperative position wherein the motor will not run, a speed change device adapted to normally retain the parts in position for a predetermined speed, but movable from this position to alter the gear ratio of said speed change device, and a locking bar connected to move with the release for permitting the speed change device to operate only when the release is in an inoperative position.

2. In a multi-speed motion picture camera, the combination with a motor, of a release therefor movable to an operative position in which the motor may run and to an inoperative position wherein the motor will not run, a speed change device adapted to normally retain the parts in position for a predetermined speed, and a locking bar cooperating with the speed change device and release through which said release may hold said speed change device from its normal position.

3. In a multi-speed motion picture apparatus, the combination with a motor drive, a release for the motor movable into two positions, a notched latching bar actuated by the release, a speed change device, a means for controlling the speed changing device including a member having a path of movement permitting said member to pass through said notch in the latching bar, whereby the former is controlled by the latter.

4. In a multi-speed motion picture apparatus, the combination with a motor drive, a release for the motor movable into two positions, a notched latching bar actuated by and movable with the release to and from an operative position, a speed change device, means for controlling the speed change device including a member adapted to pass through the notch when the latching bar is in a predetermined position, said latching bar being adapted to hold said member against movement when moved to another position.

5. In a multi-speed camera, the combination with a motor, of a release for the motor movable through a plurality of positions, a locking bar movably affixed to the release, a speed change device, a bell crank centrally pivoted having one arm actuating the speed change device and the other arm and the locking bar forming cooperating parts, one member carrying a lug adapted to engage a slot in the other member, said release being movable to control the relative movement of the cooperating parts, permitting the lug and slot to engage whereby movement of the speed change device actuating means may take place when the cooperating parts are in a predetermined position.

6. In a multi-speed camera, the combination with a motor, of gearing connecting the motor to a film moving mechanism including a gear shift, a spring for holding the gear shift in position for normal speed, a push button adapted to alter the speed from normal by moving the gear shift, a release movable into different positions for the motor, and connections between the release and push button for controlling the latter from the former.

7. In a multi-speed camera, the combination with a motor, of gearing connecting the motor to a film moving mechanism including a gear shift, a spring for holding the gear shift in position for normal speed, a push button adapted to alter the speed from normal by moving the gear shift, a release movable into different positions for the motor, and connections between the release and push button permitting the latter to be moved when the release is in a predetermined position.

8. In a multi-speed camera, the combination with a motor, of gearing connecting the motor to a film moving mechanism including a gear shift, a spring for holding the gear shift in position for normal speed, a push button adapted to alter the speed from normal by moving the gear shift, a release movable into different positions for the motor, and connections between the release and push button for controlling the latter from the former, the spring being adapted to exert a thrust on the push button through the gear shift to restore the gear shift to a normal position when pressure is released on the push button.

9. In a multi-speed camera, the combination with a motor, of gearing connecting the motor to a film moving mechanism including a gear shift, a spring for holding the gear shift in position for normal speed, a push button adapted to alter speed from normal by moving the gear shift, a release movable into different positions for the motor, a bell crank pivotally mounted within said camera and having one arm engaging said gear shift and a latch bar actuated by said release and adapted to engage the other arm of said bell crank, the spring for the gear shift being adapted to exert a thrust on the push button through the bell crank to restore the gear shift to a normal position when pressure on the push button is released.

10. In a multi-speed camera, the combination with a motor, of gearing connecting the motor to a film moving mechanism including a gear shift, a spring for holding the gear shift in position for normal speed, a release movable into different positions to start and stop the motor, a latch bar actuated by said release and provided with a notch, a bell crank having one arm engaging said gear shift and the other arm adapted to engage the notch in the latch bar, a push button adapted to actuate one arm of the bell crank and to move the gear shift into abnormal position, and a second spring for said latch bar tending to holding the latch bar and release in raised position.

Signed at Newton, Mass., this 26th day of November, 1929.

PAUL A. STEPHENSON.